United States Patent [19]

Obra

[11] 4,269,076
[45] May 26, 1981

[54] MOTION GENERATING MECHANISM

[75] Inventor: Bart Obra, St. Clair Shores, Mich.

[73] Assignee: Easom Engineering & Manufacturing, Corp., St. Clair Shores, Mich.

[21] Appl. No.: 4,466

[22] Filed: Jan. 18, 1979

[51] Int. Cl.³ .............................................. F16H 37/12
[52] U.S. Cl. ....................................................... 74/52
[58] Field of Search .................... 74/52, 63, 69; 64/29

[56] References Cited

U.S. PATENT DOCUMENTS

| | | | |
|---|---|---|---|
| 2,585,829 | 2/1952 | Perkins | 74/52 X |
| 3,530,731 | 9/1970 | Koch et al. | 74/69 |
| 3,608,391 | 9/1971 | Bargstedt et al. | 74/52 X |
| 3,848,472 | 11/1974 | Pim | 74/52 |
| 3,985,213 | 10/1976 | Braggins | 64/29 X |
| 4,005,619 | 2/1977 | Schmermund | 74/804 |
| 4,018,090 | 4/1977 | Brems | 74/52 |
| 4,020,708 | 5/1977 | Obra | 74/52 |
| 4,023,420 | 5/1977 | Dressler | 74/52 |

FOREIGN PATENT DOCUMENTS 1092652  11/1967  United Kingdom ...................... 74/63

*Primary Examiner*—Lawrence J. Staab
*Attorney, Agent, or Firm*—Basile, Weintraub & Hanlon

[57] ABSTRACT

A motion generating mechanism with a rotary output which comprises a support frame mounting a prime mover coupled through a gear reducer to drive a primary rotary member about a fixed first axis on which a sun gear is concentrically disposed. The primary rotary member carries one or more roller gears that are engaged by the sun gear such that the roller gears rotate about a second axis which is parallel to the fixed first axis and movable with respect to said first axis as the primary rotary gear is driven by the electric motor. Each roller gear has an upper portion on which is mounted a roller adapted to movably engage a slotted section formed in a plate member adapted to be driven by the roller for rotation about the aforementioned fixed first axis such that the motion of a selected point on the plate varies in a combined epicycloidal and harmonic manner relative to the velocity of the primary rotary member. The disclosure includes a device to allow selective angular displacement of the sun gear relative to the frame, permitting an angular adjustment of the dwell position.

The mechanism is disclosed as a crank shaft drive for a mechanical metal forming or piercing press. However, the drive is useable in any machine requiring a rotary output having controlled, predetermined varying angular velocities with one or more dwells per revolution.

6 Claims, 14 Drawing Figures

MOTION GENERATING MECHANISM

BACKGROUND OF THE INVENTION

I. Field of the Invention

The present invention relates to cyclically repetitive motion generating systems and, in particular, to a mechanism which will generate a rotary output that has a combined epicycloidal and harmonic motion with a device for angular adjustment of the dwell position.

II. Description of the Prior Art

U.S. Pat. Nos. 4,089,228 and 4,020,708 are related to the present disclosure. Prior to the above reference U.S. Patents, numerous apparatuses and devices have been utilized to provide a desired motion of an output member along a prescribed path such as the linear indexing mechanism disclosed in U.S. Pat. No. 3,857,292 which is designed to achieve cycloidal motion of an output member along a linear path. Other mechanisms disclosed in the prior art generally achieve cyclically repetitive motion by utilizing complicated cam grooves and followers to accomplish predetermined acceleration, deceleration, dwell, and reversing characteristics of the output member.

To the knowledge of the inventor, such machines and, in particular, the type disclosed in U.S. Pat. No. 3,857,292 have very little flexibility in varying from the cycloidal acceleration curve so as to either increase or decrease the dwell and peak speeds of the output member. Since the dwell periods for such systems have short dwell periods due to the nature of the cycloidal output motion, the electric motor driving such a mechanical mechanism has less revolutions in which to start and stop. Consequently, electrical switches and the like which must be activated by the output member of such mechanisms are activated at a higher speed (i.e. 100 rpm) by a rotating crank member; and, thus, the life expectancy of such switching mechanisms associated with the prior art mechanical devices are considerably shortened.

In mechanical metal forming presses using a progressive die to form parts, the dwell period is used to index the work piece between stations. The short dwell period of the typical harmonic motion of a standard mechanical press, requires a feed mechanism which must rapidly advance the work piece. This limits the speed at which the press can operate and imposes heavy loads and increases the potential of failure of the feed mechanism.

SUMMARY OF THE INVENTION

The present invention which will be described subsequently in greater detail comprises a mechanism for achieving a combined epicycloidal and harmonic rotary output motion. The mechanism comprises a support frame that carries a primary gear mounted for rotation about a fixed first axis and a prime mover which engages and drives the primary gear. The primary gear carries a secondary gear which is adapted for rotation about a second axis that is both parallel and movable with respect to the fixed first axis. Motion imparting means are provided for engaging the secondary gear to rotate the same about the second axis as the primary gear is rotated. A rotary member carried by the support frame is coupled to the secondary gear by means of a coupling member which rotates the rotary member in such a manner that its rotary output has a combined epicycloidal and harmonic motion.

It is therefore an object of the present invention to provide a mechanism which, with a simple constant velocity input, will produce a combined epicycloidal and harmonic rotary output motion.

It is a further object of the present invention to provide a mechanism having an output motion which can approximate a cycloidal acceleration curve, but which may be varied to either increase the dwell and the peak speed or decrease the dwell and the peak speed.

It is a further object of the present invention to provide a mechanism which is relatively simple in construction, compact in size, and which operates in an enclosed environment.

It is still a further object of the present invention to provide a rotary drive for the crankshaft of mechanical metal forming or piercing presses, the rotary drive having a combined epicycloidal and harmonic motion.

It is still a further object of the present invention to provide for a selective angular adjustment of the dwell position.

It is still a further objective of the present invention to provide a torque limiting device to prevent damage in the event the load jams.

Other objects, advantages and application of the present invention will become apparent to those skilled in the art of motion generating mechanisms of the type disclosed herein when the accompanying description of several examples of the best modes contemplated for practicing the invention are read in conjunction with the accompanying drawings.

BRIEF DESCRIPTION OF THE DRAWINGS

The description herein makes reference to the accompanying drawings wherein like reference numerals refer to like and similar parts throughout the several views and, in which:

FIGS. 3–7, inclusive, are a series of diagrammatic views illustrating the function of the parts of the mechanism illustrated in FIGS. 1 and 2 in sequential positions through one cycle of operation of the mechanism;

DESCRIPTION OF THE PREFERRED EMBODIMENT

Figure 1:
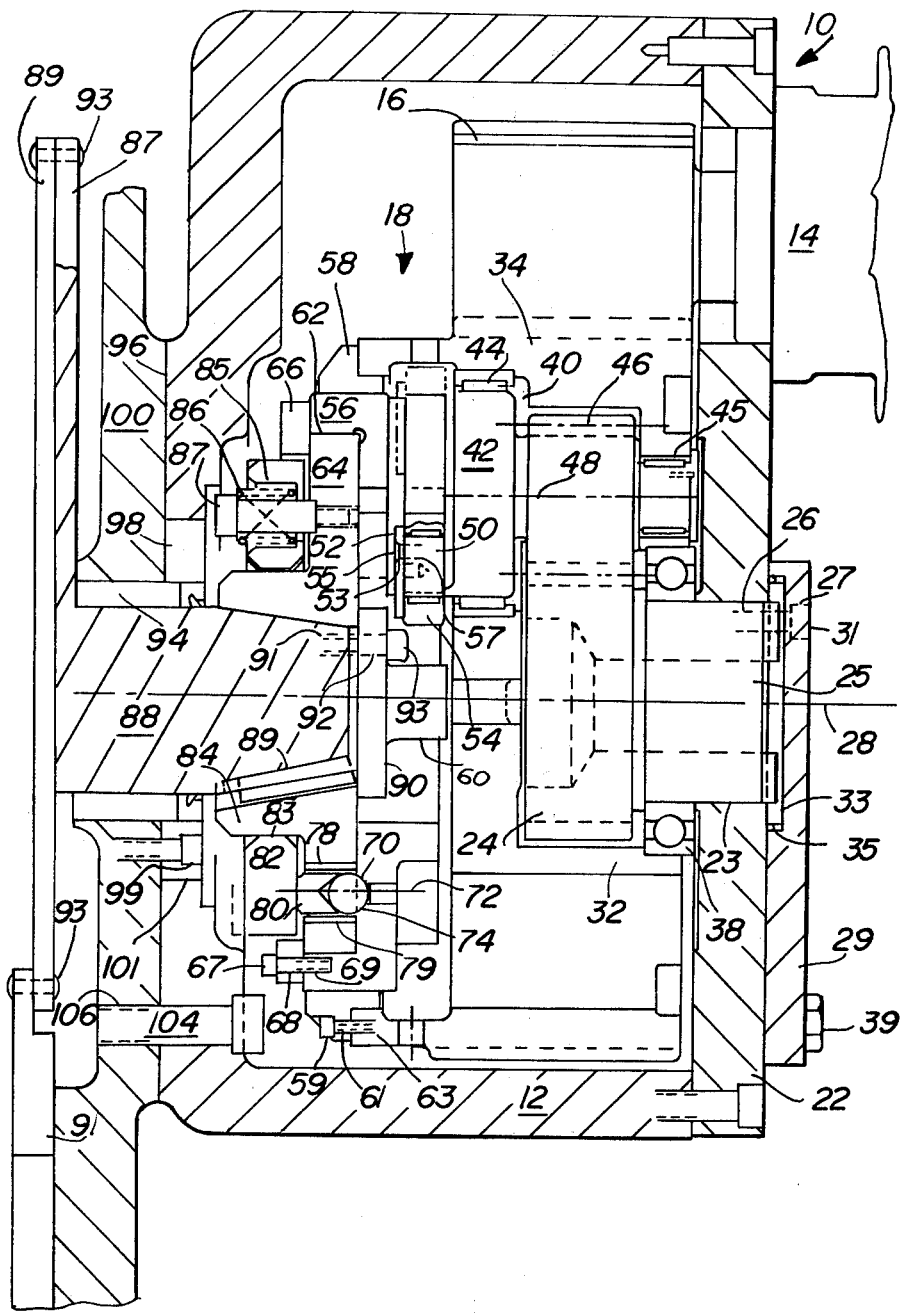
FIG. 1 is a cross sectional view of the mechanism constructed in accordance with the principles of the present invention.
Figure 2:
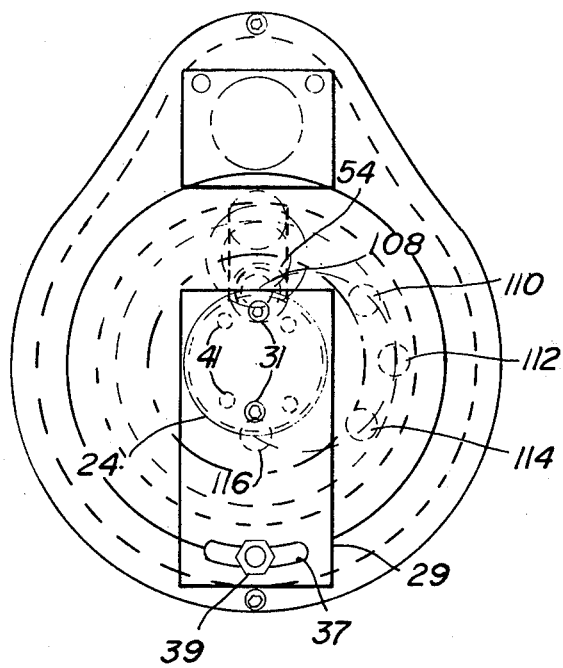
FIG. 2 is an end view of the mechanism of FIG. 1.
Figure 4:
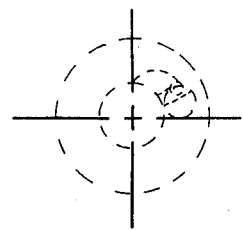

Referring now to the drawings and, in particular, to FIGS. 1 and 2 wherein there is illustrated one example of the present invention in the form of a mechanical press drive mechanism 10 comprising a base 12 that supports a prime mover 14, and a combined epicycloidal and harmonic motion generating mechanism 18. The prime mover 14 may be an electric motor which drives a pinion gear 16 which is geared to an outer gear 34 of a primary rotary member 32.

The motion generating mechanism 18 comprises a support frame 22 which supports a fixed sun gear 24 in a selectively rotatable manner in a bore 23, which slidingly receives a shaft 25 extending from one end of the gear 24. A pair of threaded apertures 26 in the end of the shaft 25 are aligned with a pair of step bores 27 in a dwell position adjustment plate 29 to receive a pair of bolts 31. A bearing 38 is supported on the shaft 25. One end of an inner race of the bearing 38 abuts a shoulder on the sun gear and the other end abuts the support frame 22. Tightening the bolts 31 brings the dwell position adjustment plate in abutment with the support frame 22, and clamps the inner race of the bearing 38 between the shoulder of the sun gear 24 and the support frame 22, supporting the sun gear 24 in a fixed position with respect to the support frame 22. A recess 33 in the plate 29 is configured to receive an elastomeric ring 35 which is squeezed between the support frame 22 and the plate 29 forming a seal. The dwell position adjustment plate 29 serves as a means for adjusting the dwell position, the details of which will be disclosed in more detail hereinbelow. The non-rotating sun gear 24 is concentric about a fixed first axis 28. The mechanism 18 further comprises the primary rotary member 32 having an outer gear 34 formed on the outer surface thereof and which is drivingly engaged by the pinion gear 16. The primary rotating member 32 is supported concentrically about the fixed axis 28 for rotation thereabout by means of the bearing 38 which is carried by the shaft 25. It can thus be seen that when the pinion gear drive gear 16 rotates to drive the outer gear 34, the primary rotating member 32 will rotate about the fixed axis 28 concentric with the sun gear 24.

Figure 13:
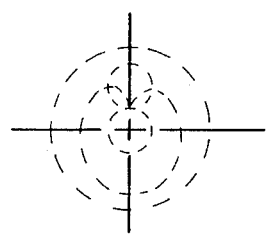
FIGS. 13 and 14 illustrate the prescribed path followed by the support pins of the mechanism for one revolution of mechanisms having a 1:1 and a 4:1 ratio respectively between the sun gear and the planet gear.
Figure 14:
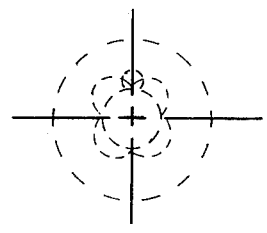

The primary rotating member 32 is provided with a plurality of arcuately spaced step bores 40 which rotatably support secondary rotary members 42 by means of an outer bearing 44 and an inner bearing 45, both of which are carried by the primary rotating member 32. Hereinafter only one of the secondary rotary members 42 will be described as the remaining members are identical thereto; and, thus, a reference to one should be sufficient for an understanding of the remaining rotary members 42. It should also be understood that while only one rotary member 42 is illustrated in FIG. 2, the present invention may be constructed with one or more such rotary members 42 depending upon the size of the load to be powered by the mechanism. As can best be seen in FIG. 1, the secondary rotary member 42 has an inner portion on which is formed a roller or planetary gear 46 that is adapted to mesh with the non-rotating sun gear; and, thus, it can be seen that as the drive gear 16 rotates the primary rotating member 32 about the fixed axis 28, the engagement of the roller gear 46 with the sun gear 24 will result in the rotation of the secondary rotary member 42 about an axis 48. The gear 46 is concentric about axis 48 which, in turn, is parallel to the fixed axis 28 but angularly movable with respect to the fixed axis 28 as the primary rotating member 32 rotates. It should be noted that a 2:1 ratio between the non-rotating sun gear 24 and the planetary or roller gear 46 is illustrated in FIGS. 1–7, producing two dwells per revolution. Any ratio can be established between the sun gear and the planetary gear, and this will result in a varying number of dwells per revolution. A 1:1 ratio between the sun gear and the planetary gear is illustrated in FIG. 13 which produces one dwell per revolution. A 4:1 ratio between the sun gear and the planetary gear is illustrated in FIG. 14 which produces four dwells per revolution.

As can best be seen in FIG. 1 the outer portion of the secondary rotary member 42 is provided with a support pin 50 having an axis parallel to the axis of the rotary member 42.

The outer end of the pin 50 rotatably supports a drive roller 54. A plate 52 has an aperture 53 configured to recess a screw 55. A threaded bore 57 in the end of pin 50 is aligned with the aperture 53 to receive the screw 55 and hold the plate 52 and the roller 54 in position. As can also be seen in FIG. 1, the drive roller 54 is disposed on the pitch line of the roller gear 46. During the initial operation of the mechanism 18 when the drive roller 54 is in line with the pitch line of the roller gear 46 on the side thereof closest to the axis 28 (as shown diagrammatically in FIG. 3), the mechanism 18 will be at a dwell position. As the primary rotating member 32 rotates and thereby rotates the secondary member 42 to move the roller 54 along the path illustrated in phantom lines in FIG. 2, the roller 54 will move to a position at a point farthest away from the axis 28 at which time a maximum angular velocity of plate 56 will have been reached (FIG. 5). While the motion and operation of the mechanism 18 will be described in greater detail hereinafter, it should also be noted that by changing the relationship of the drive roller 54 with respect to the roller gear 46, that is, by repositioning the drive roller 54 at locations toward the center axis 48 of the roller gear 46 (at positions away from the pitch line of the roller gear 46), the maximum velocity and dwell period will decrease. If the drive roller 54 is moved radially outward from the axis 48, that is, beyond the pitch line of the roller gear 46, the maximum velocity and dwell period would increase. There would also be a very slight reverse displacement in the output motion of the mechanism which would occur at the dwell point and which will be described hereinafter in greater detail.

Still referring to FIG. 1, the mechanism 18 further comprises a slotted plate member 56 which is supported on a crank shaft 88 for rotational movement about the axis 28. A bearing 58 is secured to the outer end of the primary rotary member 32 by a plurality of the threaded fasteners 59 which pass through a plurality of apertures 61. The apertures 61 are aligned with a plurality of threaded bores 63 in the primary member 32 configured to receive the screws 59. The inside of the slotted plate member 56 is provided with a plurality of radially disposed slots 60 which movably receive the drive rollers 54. It can thus be seen that as the primary rotating member 32 is rotated so as to cause a rotational movement of the secondary rotating members 42 about the axis 48, the movable engagement of the drive rollers 54 and the slots 60 will rotate the slotted plate member 56 about the axis 28 with a motion having an acceleration-velocity characteristic as will be described hereinafter.

The slotted plate member 56 has a bore 62 at its outer rim configured to rotatably support a flange 64 along the axis 28, with a wall abutting the crank plate member 56. A keeper ring 66 is secured to the outer surface of the crank plate 56 by means of a plurality of screws 67 which pass through the plurality of apertures 68 in the keeper ring 66. The bores apertures are aligned with a plurality of threaded apertures 69 in the crank plate 56 which are configured to threadingly receive the threaded end of the screws 67 and secure the keeper plate 66 to the crank plate 56. The outer rim of the hub 64 is slidingly retained between the bottom of the bore 62 and an innerface of the keeper ring 66.

A plurality of tapered bores 70 are disposed in an arcuate manner in the bottom of the bore 62 in the slotted plate 56. Each tapered bore 70 has a center axis 72 which is placed at a different radius from the axis 28, the reason for these differing radii will be described more fully later. Each tapered bore 70 is configured to nestingly receive a ball 74. A plurality of bores 78 are disposed in the hub 64, each bore 78 aligned with a corresponding axis 72 so that each axis 72 has a corresponding bore 78 with which it will align. Each bore 78 has a bushing 79 pressed therein, the bushing 79 being retained by friction. The bore of the bushing 79 slidingly surrounds the diameter of the ball 74. A push rod 80 is slidingly received by the inside diameter of the bushing 79. The push rod 80 having a flat end and a concave conical end which engages the ball 74 urging the ball 74 into nesting contact with the tapered bore 70. The flat end of the push rod 80 rests against a spring plate 82. The spring plate 82 has an inner bore 83 which is slidingly guided by a flange 84 of the hub 64. The spring plate 82 has disposed in an arcuate manner around its periphery a plurality of stepped bores 85. Each stepped bore 85 accommodates within its larger diameter a compression spring 86, one end of the compression spring 86 rests upon the bottom of the stepped bore 85, and the other end of the spring 86 is compressed by a shoulder bolt 87' which is threadingly received by a plurality of apertures in the hub 64 aligned with the stepped bores 85. The compression of the springs 86 urges the spring plate 82 into an abutment with the push rod 80 which urges the ball 74 into nesting engagement with the tapered bore 70. As can be readily seen when excessive torque is exerted by the slotted plate 56 the balls 74 are disengaged from the tapered bores 70 which urges the spring plate to compress the spring 86 and allow movement of the slotted plate 56 relative to the flange 64. The amount of compression on the spring 86 and the number of springs 86 employed to urge the spring plate 82 against the push rod 80 and against the ball 74 will determine the maximum torque that can be transmitted between the slotted plate 56 and the hub 64. Since each tapered bore 70 is on a different axis 72, and each axis 72 has a corresponding bore 78, there is only one relative angular position between the slotted plate 56 and the hub 64 where a bore 70 will align with its corresponding ball 74. Therefore, when the maximum allowable torque has been exceeded the slotted plate 56 and the hub 64 will always reengage for rotation at the same angular position.

Figure 10:
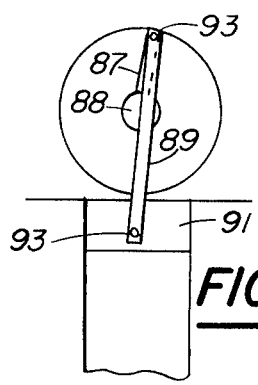
FIGS. 10–12 illustrate the linear motion of the press platter as the crank rotates.
Figure 11:
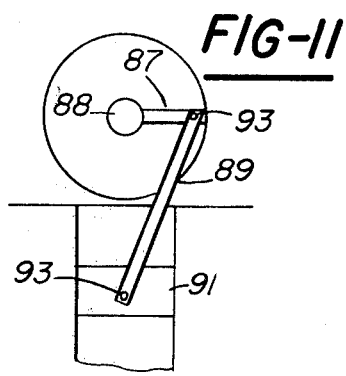
Figure 12:
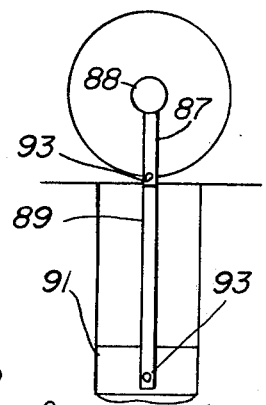

The crank shaft 88 of the machine to which the base 12 is to be attached projects from the machine and has a tapered end with a key 89. The center bore of the hub 64 is tapered to accommodate the taper of the shaft 88 and has a keyway to accommodate the shaft key 89. A keeper plate 90 is configured to overlay the smaller diameter of the hub bore, and the tapered end of the shaft 88 has a pair of threaded apertures 95 therein. A pair of apertures 92 in the keeper plate 90 are aligned with the threaded apertures 95 and a pair of bolts 93 pass through the apertures 92 and threadingly engage the apertures 95 to secure the plate 90 against the inside face of the hub forcing the hub into engagement with the tapered end of the crank shaft 88. The end of the crank shaft 88 opposite the tapered end supports a crank 87 which pivotally drives a first end of a link 89 by means of a first pivot pin 93. A second pivot pin 93 at a second end of the link 89 pivotally connects the second end of the link 89 to a platen 91. The platen 91 is slidingly guided between sides of the machine frame 100. Thus the rotary motion of the shaft 88 is converted to a linear motion of the platen 91 (FIGS. 10–12).

The crank shaft 88 is supported in the frame of the machine 100 by a bushing 94 which projects outward a distance from the mounting face 96 of the machine 100. A pilot ring 98 has an inside diameter which snugly fits the outside diameter of the bushing 94, and the ring 98 is secured to the frame of the machine 100 by a plurality of bolts 99 which pass through the ring 98 to be threadingly received by threaded apertures in the housing of the machine 100. A bore 101 through the wall of the base 12 concentric with the axis 28 is configured to slidingly engage the outside diameter of the pilot 98 and align the crank shaft with the axis 28. A plurality of bolts 104 pass through a plurality of apertures 104 in the base 12, and align with a plurality of threaded apertures 106 in the base of the machine to be driven 100. Threading the bolts 104 into the threaded apertures 106 secures the base 12 to the machine 100.

Referring momentarily to FIG. 2, the positions of the drive roller 54 are illustrated in phantom lines at 108–116. At the position 108 the drive roller 54 corresponds to the position illustrated in FIG. 3, that is, at the start of the cycle. The position 110 in FIG. 2 corresponds to the position of the pin 50 in an intermediate position (FIG. 4) between the dwell point at 108 and the maximum velocity position 112. The position 112 corresponds to the diagrammatical illustration shown in FIG. 5 and represents the mid-stroke and maximum velocity of the pin 50.

Figure 6:
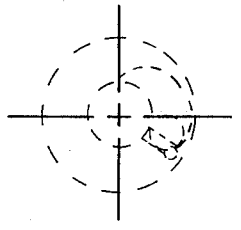

FIG. 6 illustrates the position of the pin 50 during the deceleration phase of the pin 50 (114 of FIG. 2) while FIG. 7 diagrammatically illustrates the pin at the dwell position (116 of FIG. 2), when the drive roller 54 is positioned closest to the fixed axis 28. It should be noted that at this point the motor 14 may be reversed and the cycle reversed to move the crank shaft 88 to the initial start position, illustrated in FIG. 3. Alternately, and preferably, the electric motor 14 continues to operate in the same direction eliminating the need for a reversing motor and controls.

The embodiment illustrated in FIGS. 1 and 2 of the drawings offers considerable advantages over the prior art structures in that longer dwell periods are obtainable with the epicycloidal-harmonic index mechanism and, as such, the electric motor 14 is permitted to have more load-free revolutions in which to start and has more revolutions in which to stop. Additionally, if a clutch is needed to operate the system the clutch can be engaged at a lower velocity, thus a longer life expectancy of the clutch and the mechanism associated therewith can be expected.

It should also be noted that since the mechanism may be completely enclosed, there are no difficulties with falling chips or cooling problems. Additionally, since the mechanism may be totally enclosed, the various gears may be grease packed, thus, eliminating special lubrication problems. It can also be seen that because of the simple construction of the apparatus, it may be easily manufactured.

Figure 8:
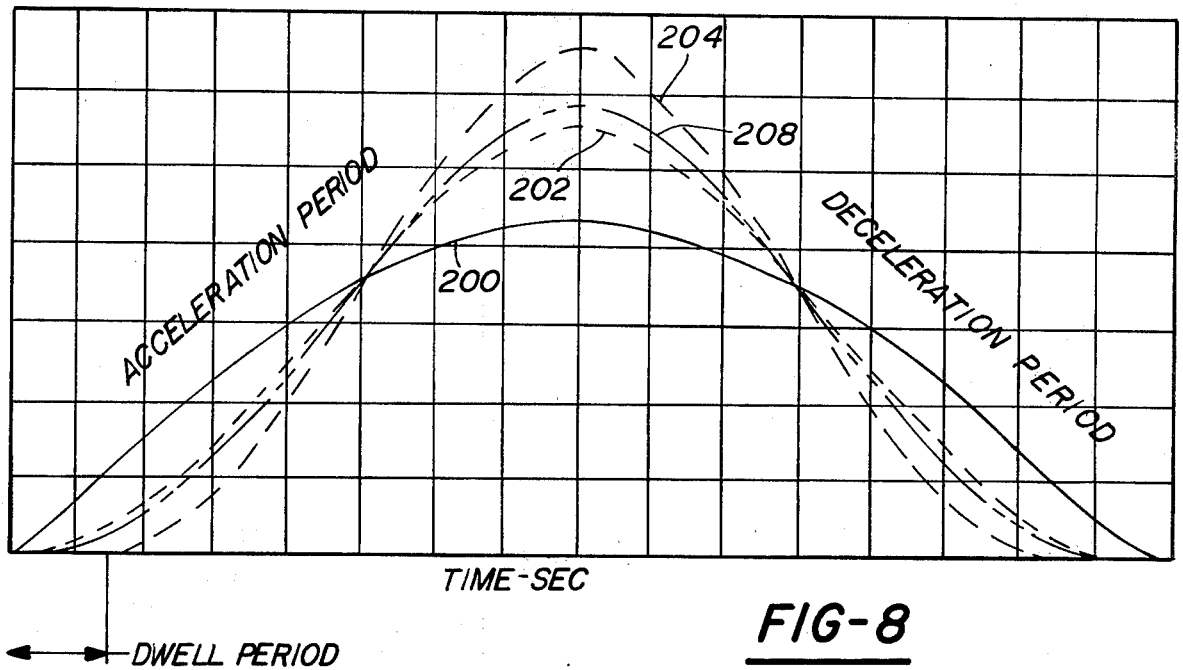
FIG. 8 illustrates in graph form the harmonic cycloidal, and combined epicycloidal and harmonic velocity versus time characteristics of an output member moving along a prescribed path for a mechanism having a 2:1 ratio between the diameter of the sun gear and the diameter of the planetary gear.

Referring now to FIG. 8, there is illustrated a velocity vs. time graph illustrating the harmonic motion on curve 200, the cycloidal motion on curve 202, and the combined epicycloidal-harmonic motion on curve 204. It can be seen that while the rate of acceleration of the harmonic curve 200 is much greater initially than either the cycloidal or combined epicycloidal-harmonic curves 202 and 204, the maximum velocity obtained by the cycloidal curve 202 and the combined epicycloidal-harmonic curve 204 are greater with the maximum or peak velocity for the combined epicycloidal-harmonic curve 204 being 1½ times the peak velocity of the harmonic motion when the ratio of 2:1 is maintained between the sun gear 24 and the roller gear 46, as aforementioned.

In comparing the combined curve 204 with the cycloidal curve 202, it will be noted that an output member following the combined curve 204 has a more gradual start-up time, and in the middle area of the curve 204 the output member will start accelerating faster than the cycloidal motion and will peak out at a higher speed than the cycloidal motion. As aforementioned, the combined epicycloidal-harmonic curve 204, that is, the motion obtainable by applicant's invention, may be easily modified by changing the position of the drive roller 54 with respect to the axis 48 of the roller gear 46. If the center of the drive roller 54 is moved in closer to the axis 48, the rate of acceleration and peak speed at 210 will decrease and a shorter dwell period will be obtained as shown on the modified epicycloidal-harmonic curve 208 in FIG. 8. If the center of the drive roller 54 is positioned at the axis 48, that is, at the center of the roller gear 46, there will be in effect a straight coupling between the gear 46 and the crank plate member 56, and a harmonic motion will be obtained as shown by the curve 200. If, on the other hand, the drive roller 54 should be moved out beyond the pitch diameter of the roller gear 46, there will be an incremental reverse motion at the start of the cycle, and, in effect, the slotted plate 56 would back up slightly then go forward. This would in effect lengthen the dwell period while also increasing the rate of acceleration and peak speed.

It can thus be seen that the present inventive mechanism provides a great variety of rates of acceleration which are not obtainable in any of the aforementioned prior art apparatuses known to the inventor. The present invention provides a simple means for obtaining a full range of rates of acceleration and dwell periods from that obtained by harmonic to that obtained through applicant's combined epicyloidal-harmonic motion.

Figure 9:
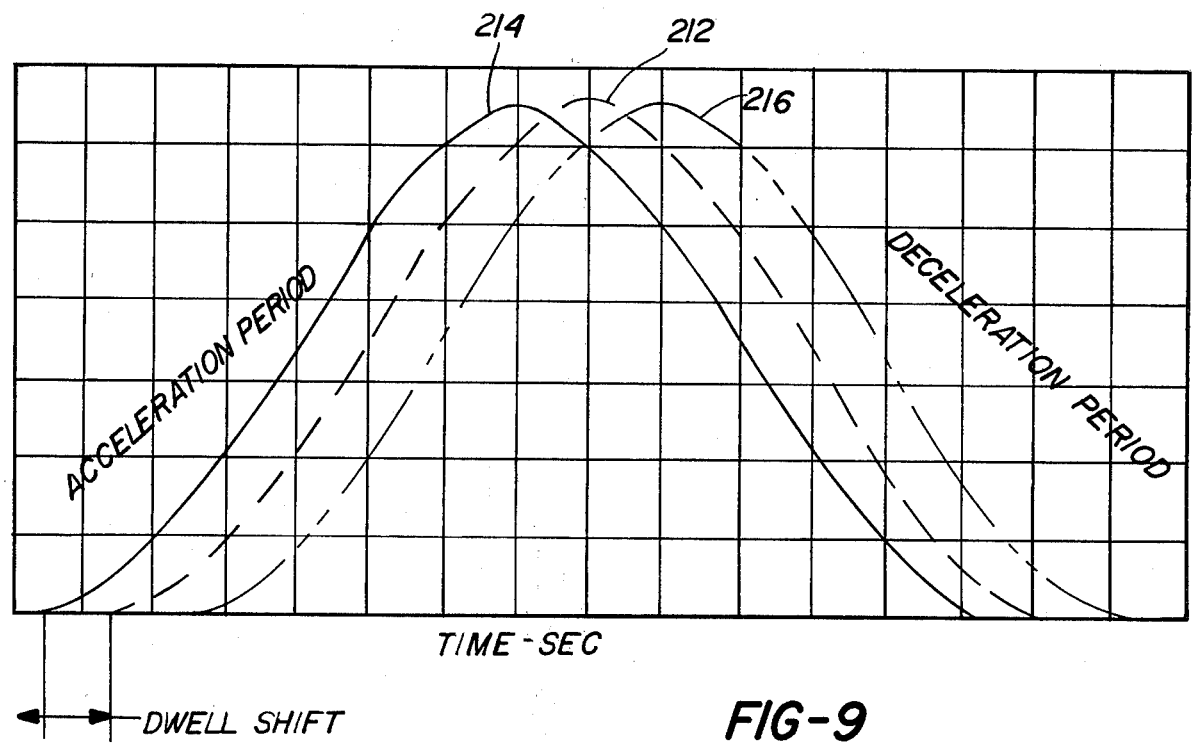
FIG. 9 illustrates in graph form the angular displacement of the dwell using the inventive mechanism of FIG. 8.

Referring again to FIGS. 1 and 2 wherein there is illustrated a device for selectively positioning the dwell period and maximum velocity position of the basic displacement curve with respect to the base 12. The shape of the basic curve which defines its dwell period and peak velocity is determined by the position of the support pin 50 with respect to the pitch diameter of the planet gear 46. The sun gear 24 is configured to remain stationary and non-rotating during the operation of the device. If the sun gear is selectively rotated in a first direction the dwell position can be shifted relative to the base 12 toward the curve 214 as shown in FIG. 9. The amount of dwell shift is determined by the amount of rotation of the gear 24. If the sun gear is rotated in a counter direction or a second direction, the dwell is shifted toward the curve 216 shown on FIG. 9. Repositioning of the dwell relative to the other elements in the machine can be particularly useful in mechanical metal forming and piercing presses where it may be desirable to decelerate the press platen and increase the force at varying points within its stroke, such as when punches are scheduled to pierce a workpiece.

A means for shifting the dwell relative to other elements in the machine comprises a dwell rotation adjustment plate 29 which rotatably positions the sun gear 24 and when the plate 29 is locked in position the sun gear 24 is in turn locked in position. A pair of bolts 31 passing through the dwell rotation adjustment plate 29 engage the threaded apertures 26 in the shaft extension 25 of the sun gear to rotationally lock the dwell position plate 29 and the sun gear 24 together. An arcuate slot 37 has a radius equal to the displacement of the slot 37 from the axis 28. The width of the slot 37 slidingly surrounds the shank of a bolt 39 which threadingly engages a support frame 22. When the bolt 39 is loosened, the plate 29 is rotatable about the axis 28, and as the plate 29 is rotated the slot 37 moves along the shank of the bolt 39. Rotation of the plate 29 rotates the sun gear 24 in a first direction to move the dwell curve toward the curve 214 in FIG. 9 and rotation of the plate 29 in a counter direction moves the dwell toward the curve 216 in FIG. 9. If it is necessary to shift the dwell more than would be allowed by the length of the slot 37, the screw 31 can be removed and inserted into circumferentially displaced threaded apertures not shown in the end of the shaft 23 allowing further rotation of the sun gear 24 with respect to the base 12.

It can thus be seen that the present invention has provided a new and improved mechanism which, with a simple constant velocity input, will produce a combined epicycloidal and harmonic rotary output motion all of which is accomplished in the manner which offers the user a great variety of acceleration characteristics heretofore unattainable with a single design.

It should also be noted that the present invention has provided a mechanism of the type described herein which is relatively simple in construction, compact in size, and which operates in an enclosed and thus safe environment.

It should also be noted that the present invention may be employed to actuate presses and other types of mechanisms which would benefit from the combined epicycloidal and harmonic motion.

It should be understood by those skilled in the art of motion generating machines that other forms of the present invention can be had all coming within the spirit of the present invention and the scope of the appended claims.

What is claimed is as follows:

1. A combined motion generating mechanism comprising:

a support frame;

a first rotary member carried by said support frame for rotation about a fixed first axis;

first driving means for driving said first rotary member;

a second rotary member carried by said first rotary member and rotatable therewith about said first axis as said second rotary member rotates about a second movable axis that is parallel to said first axis;

rotation inducing means carried by said support frame, a third rotary member for rotation about said first axis, said third rotary member being axially spaced from said first and second rotary members, said third rotary member having one side thereof adjacent said second rotary member, said one side having a radial slot;

a coupling member carried by said second rotary member and disposed along an axis which is spaced from said second axis, said coupling member movably engaging said third rotary member slot to rotate said third rotary member about said first axis as said second rotary member rotates whereby the motion of said third rotary member varies in a combined epicycloidal and harmonic manner relative to the acceleration and velocity of said first driving means;

said rotation inducing means is a stationary sun gear carried by said support frame, said second rotary member having a gear formed thereon positioned radially outward from the sun gear and engaging said stationary sun gear such that said second rotary member rotates about said second movable axis as said first rotary member moves said second rotary member relative to said stationary gear;

said coupling member being disposed along an axis which is spaced from said second axis; and means for shifting an angular position of the combined epicycloidal and harmonic motion of said third rotary member relative to the position of the first member comprising the stationary gear rotatably supported about the first axis by the frame; an adjustment plate attached to a shaft of the stationary gear, the adjustment plate rotatable about the first axis with the stationary gear, and means for selectively attaching the adjustment plate to the frame.

2. The motion generating mechanism as defined in claim 1 further comprising:

the coupling member engaging the third rotary member by means of the slot for imparting motion thereto, said coupling member disposed along an axis which is spaced from said second axis; and said coupling member having an axis in line with the pitch line of said second rotary member gear.

3. The motion generating mechanism as defined in claim 2 further comprising:

means for limiting the output torque of said third rotary member.

4. The motion generating mechanism as defined in claim 3 wherein the output torque limiting means comprises:

a tapered bore in an outer wall of said third rotary member;

a ball resting within said tapered bore;

a flange rotatably supported along said first axis;

a bore in a wall of the flange abutting the third rotary member, said bore slidingly receiving the ball;

a means for biasing the ball into the tapered bore allowing the flange to rotate with the third rotary member; and wherein when the torque of the third rotary member exceeds an amount required to displace the ball against the biasing means, the third rotary member rotates independent of the flange.

5. The motion generating mechanism as defined in claim 2 wherein the ratio of the stationary gear to the second rotary member gear is variable by replacing the stationary gear with a stationary gear of different size to vary the number of motion cycles per revolution.

6. The motion generating mechanism as defined in claim 2 wherein the ratio of the stationary gear to the second rotary member gear is variable by replacing the second rotary member gear with a gear of different size to vary the number of motion cycles per revolution.

* * * * *

UNITED STATES PATENT AND TRADEMARK OFFICE
CERTIFICATE OF CORRECTION

PATENT NO. : 4,269,076
DATED : May 26, 1981
INVENTOR(S) : Bart R. Obra

It is certified that error appears in the above-identified patent and that said Letters Patent are hereby corrected as shown below:

Column 3, line 35, following "pinion" delete "gear";

Column 4, line 67, following "The" delete "bores" and following "apertures" insert --68--;

Column 6, line 21, following "apertures" delete "104";

Column 6, line 23, following "driven" delete "100";

Column 8, line 8, following "bolts" insert --or screws--;

Column 8, line 64, following "frame" delete the comma and insert a semicolon.

Signed and Sealed this

Eighteenth Day of August 1981

[SEAL]

Attest:

Attesting Officer

GERALD J. MOSSINGHOFF

Commissioner of Patents and Trademarks